US005588088A

United States Patent [19]

Flaman

[11] Patent Number: 5,588,088

[45] Date of Patent: Dec. 24, 1996

[54] HOT WATER TEMPERING SYSTEM UTILIZING A STORAGE TANK, A BYPASS LINE AND A PROPORTIONAL FLOW CONTROLLER

[76] Inventor: Michael T. Flaman, 20 Treeline Court, Etobicoke, Ontario, Canada, M9C 1K8

[21] Appl. No.: 262,705

[22] Filed: Jun. 20, 1994

[51] Int. Cl.$^{6}$ .......... F24H 1/18

[52] U.S. Cl. .......... 392/449; 126/362; 126/344; 137/341; 137/99; 137/109; 251/248; 251/208

[58] Field of Search .......... 392/449–454, 392/441; 126/362, 361, 344; 122/13.2, 13.1, 4 A; 4/668, 675; 236/12.11, 12.12, 12.13; 137/262, 386, 341, 99, 109, 9, 98; 251/205–209, 248, 250.5, 82, 212

[56] References Cited

U.S. PATENT DOCUMENTS

| | | | |
|---|---|---|---|
| 962,111 | 6/1910 | Assmann | 137/98 |
| 990,557 | 4/1911 | Holmen | 137/98 |
| 1,842,825 | 1/1932 | Cunningham | 137/98 |
| 2,090,843 | 8/1937 | King | 137/98 |
| 2,200,578 | 5/1940 | Mahon | 137/98 |
| 2,593,701 | 4/1952 | Sanford | 137/98 |
| 2,990,840 | 7/1961 | Snow | 137/98 |
| 3,139,104 | 6/1964 | Love | 137/98 |
| 3,324,872 | 6/1967 | Cloud | 137/98 |
| 3,958,555 | 5/1976 | Horne . | |
| 4,378,784 | 4/1983 | Frank | 126/584 |
| 4,437,484 | 3/1984 | Laing et al. | 126/362 |
| 4,444,215 | 4/1984 | Zakausky | 137/98 |
| 4,609,333 | 9/1986 | Masel et al. | 122/13 R |
| 4,658,760 | 4/1987 | Zebuhr | 126/362 |
| 4,889,317 | 12/1989 | Kelsey | 251/212 |

FOREIGN PATENT DOCUMENTS

| | | |
|---|---|---|
| 2099959 | 12/1982 | United Kingdom . |

*Primary Examiner*—John A. Jeffery
*Attorney, Agent, or Firm*—Ridout & Maybee

[57] ABSTRACT

A hot water tempering system tempers the output of a hot water storage tank by mixing that output with a cold water flow in a defined ratio to produce a flow of water at a steady intermediate temperature. The system comprises a bypass line connectable between an inlet line and an outlet line of the storage tank, and a proportional flow controller for controlling the relative water flow rates through the tank and through the bypass line. The flow controller may be positioned on the inlet line and the bypass line, or on the outlet line and the bypass line. The tempering system allows the temperature of water in the storage tank to be maintained near the boiling point for killing organisms, but at the same time ensures that water leaves the system at a temperature sufficiently low to be safe for human use.

13 Claims, 4 Drawing Sheets

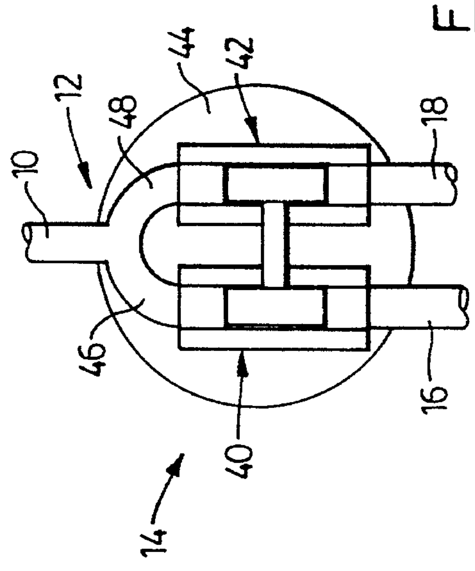
FIG. 3
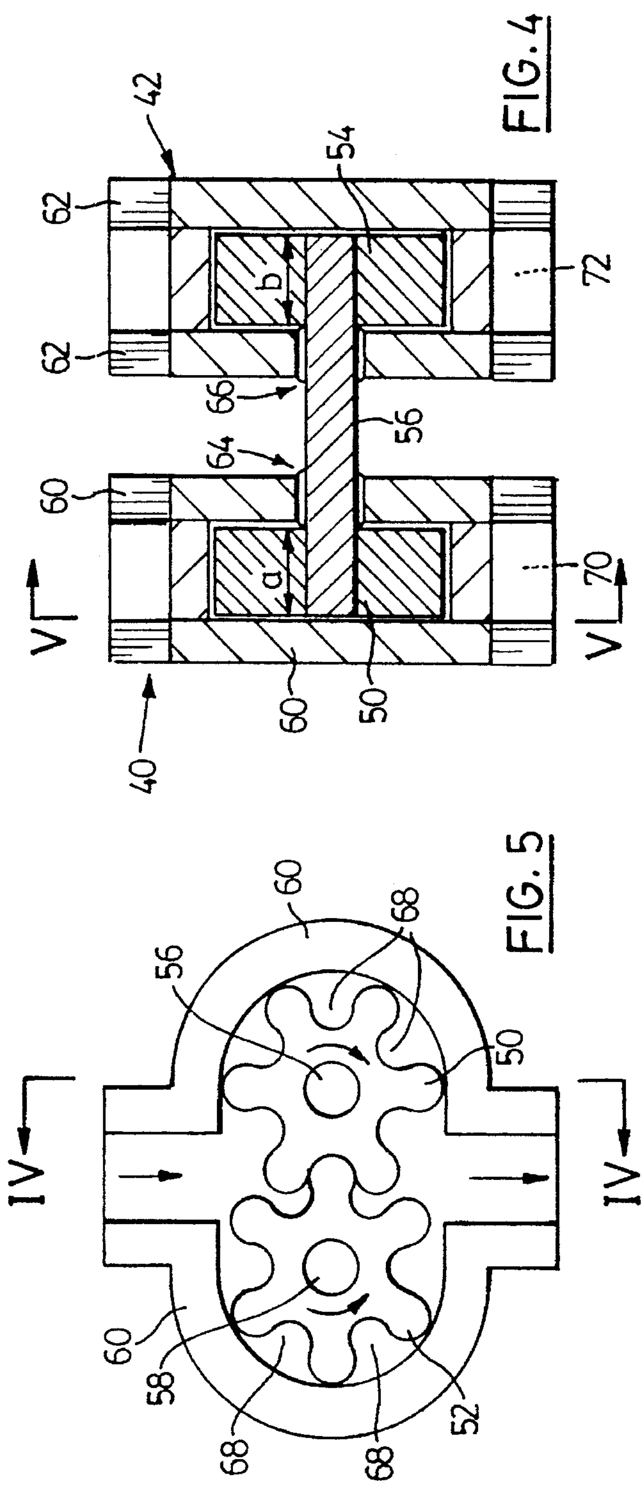
FIG. 4
FIG. 5

HOT WATER TEMPERING SYSTEM UTILIZING A STORAGE TANK, A BYPASS LINE AND A PROPORTIONAL FLOW CONTROLLER

BACKGROUND OF THE INVENTION

The invention relates to a tempering system for hot water, more particularly, to a system that tempers the output of a hot water storage tank by mixing that output with a cold water flow in a defined ratio to produce a flow of water at a steady intermediate temperature.

It is desirable to maintain the temperature of water in a hot water storage tank as high as possible in order to kill bacteria and other growth organisms that multiply at tepid temperatures. However, unless tempered in some way, the scalding water discharged from such a tank may be dangerous to a consumer. Because of the potential danger the water temperature in many conventional water heater systems is maintained at or below approximately 140° F.

Various systems have been proposed for maintaining a high water temperature in a hot water storage tank, and tempering the output. A number of systems use a heat exchanger arrangement in which the output of the storage tank is fed through a heat exchanger; the water gives up a portion of its heat to cold water entering the tank. One such system is disclosed in U.S. Pat. No. 5,115,491, which was granted to M. Perlman, J. M. Bell and C. A. McGugan on May 19, 1992. In that system a thermostat in the storage tank output and a bypass valve are used to adjust the flow of cold water through the heat exchanger based on the temperature of water leaving the tank; as that temperature drops, a larger part of the cold water flow is allowed to bypass the heat exchanger.

U.S. Pat. No. 3,007,470, granted to Heeger, and U.S. Pat. No. 3,958,555, granted to Horne, disclose other arrangements for maintaining water in a hot water storage tank at high temperature and tempering the output. Heeger utilizes two storage tanks, with water being transferred to a temperate water storage tank from a main hot water storage tank. The water in the two tanks is exchanged at a rate sufficient that temperate water is kept above a fixed minimum temperature. Horne discloses a system in which a hot water tank output flow is tempered, and then recirculated until use; the temperature of the recirculating water is maintained by a heat exchanger. The tempering systems of both Horne and Heeger are relatively complex.

OBJECT OF THE INVENTION

It is an object of the invention to provide a simple tempering system for a hot water heater/storage tank which, in a simple and effective manner, allows the contents of the tank to be maintained at scalding temperature for bacterial growth control, yet also provides a safe flow of temperate water on demand.

SUMMARY OF THE INVENTION

In one form the invention is a hot water tempering system comprising in combination a hot water storage tank, a bypass line, and a proportional flow controller. The tank has an inlet line and an outlet line; the inlet line is connectable to a cold water supply line. The bypass line is connectable between the inlet line and the outlet line. The flow controller is positionable on the inlet line and the bypass line for linking the rates of water flow in those lines in a defined steady ratio. Alternatively, the flow controller is positionable on the outlet line and the bypass line for linking the rates of water flow in those lines in a defined steady ratio.

A proportional flow controller is a device for locking the volumetric flow rates in two fluid lines in a constant ratio independently of changes in fluid pressure in the lines. One example of a proportional flow controller, as described herein, comprises a pair of interconnected positive displacement metering valves of the gear pump type, each connected in a respective one of the fluid lines.

The invention will be more clearly understood by reference to the accompanying drawings illustrating by way of example one embodiment thereof.

BRIEF DESCRIPTION OF THE DRAWINGS

FIG. 3 is an enlarged view of a detail of the proportional flow controller shown in FIG. 1;

FIG. 4 is a longitudinal sectional view of the detail shown in FIG. 3, the view being taken at the location of the line IV—IV in FIG. 5;

FIG. 5 is a longitudinal sectional view taken along the line V—V (between the plates) in FIG. 4; and, FIG. 6 is a longitudinal sectional view of a modified outlet line for the water storage tank, the modified arrangement having a stopper valve in the outlet line.

DESCRIPTION OF THE PREFERRED EMBODIMENT

Figure 1:
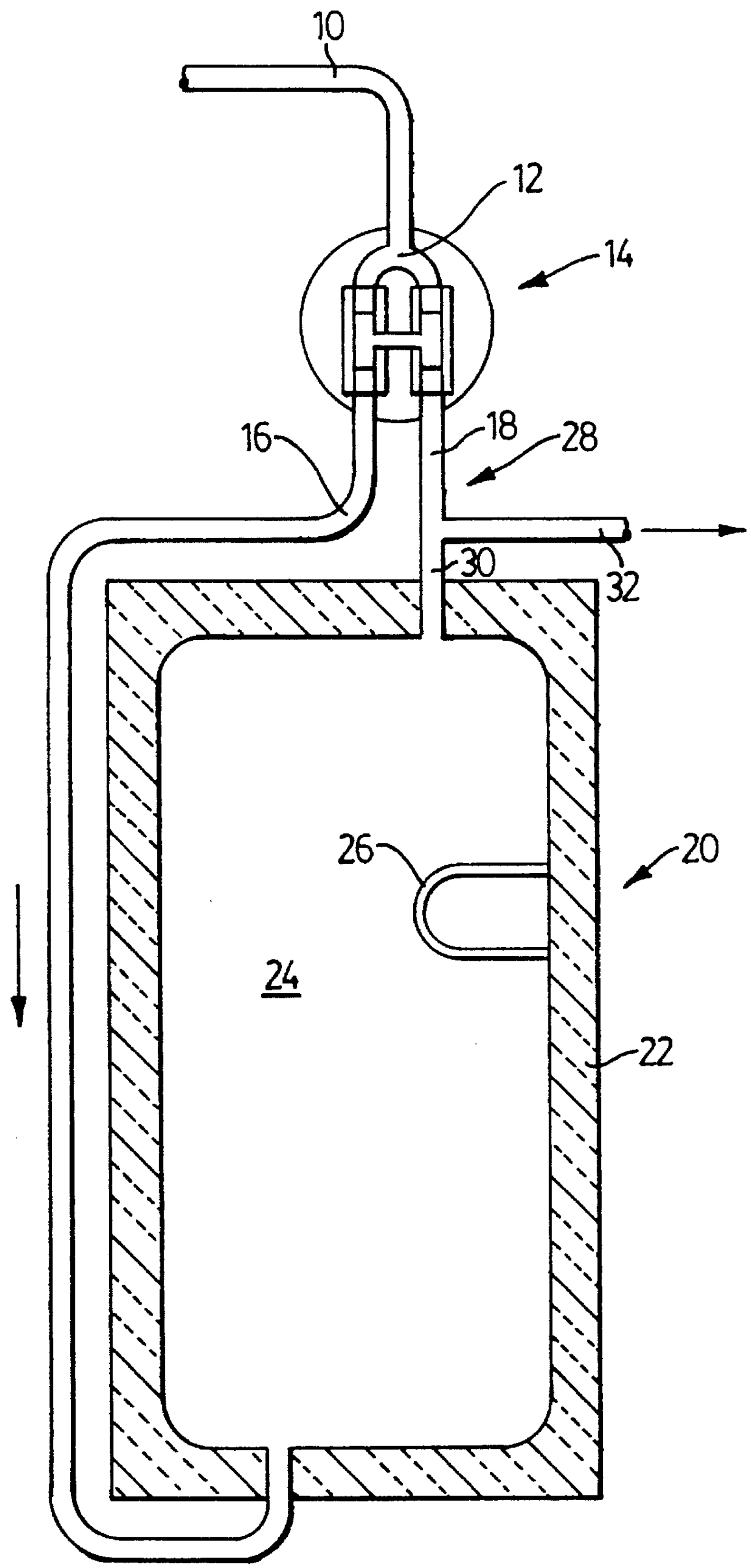
FIG. 1 is a longitudinal sectional view of a first embodiment of the tempering system of the invention.

The first embodiment of the tempering system is illustrated in FIG. 1. A pipe 10 carries cold water from a water supply to an inlet of a Y-shaped junction member 12, which in the present example is integrated with a proportional flow controller 14. The junction member 12 has two outlets, each of which is connected to an inlet of a respective metering valve within the controller 14, as will be described subsequently. An inlet line 16 and a bypass line 18 are connected to respective outlets of the proportional flow controller 14. The inlet line 16 carries cold water to a hot water storage tank generally designated 20. The tank 20 is encased in an insulating material 22, such as glass fibre, in order to prevent heat being dissipated from stored water 24. A heating element 26 in the tank 20 heats the water 24.

The bypass line 18 feeds cold water directly to one of the inlets of a T-shaped junction member 28. An outlet line 30 of the hot water storage tank 20 is connected to a second inlet of the junction member 28. The water flowing into the junction member 28 through lines 18 and 30 is mixed as it leaves the junction member 28 into a delivery line 32. The line 32 transports away the resulting temperate water.

Figure 2:
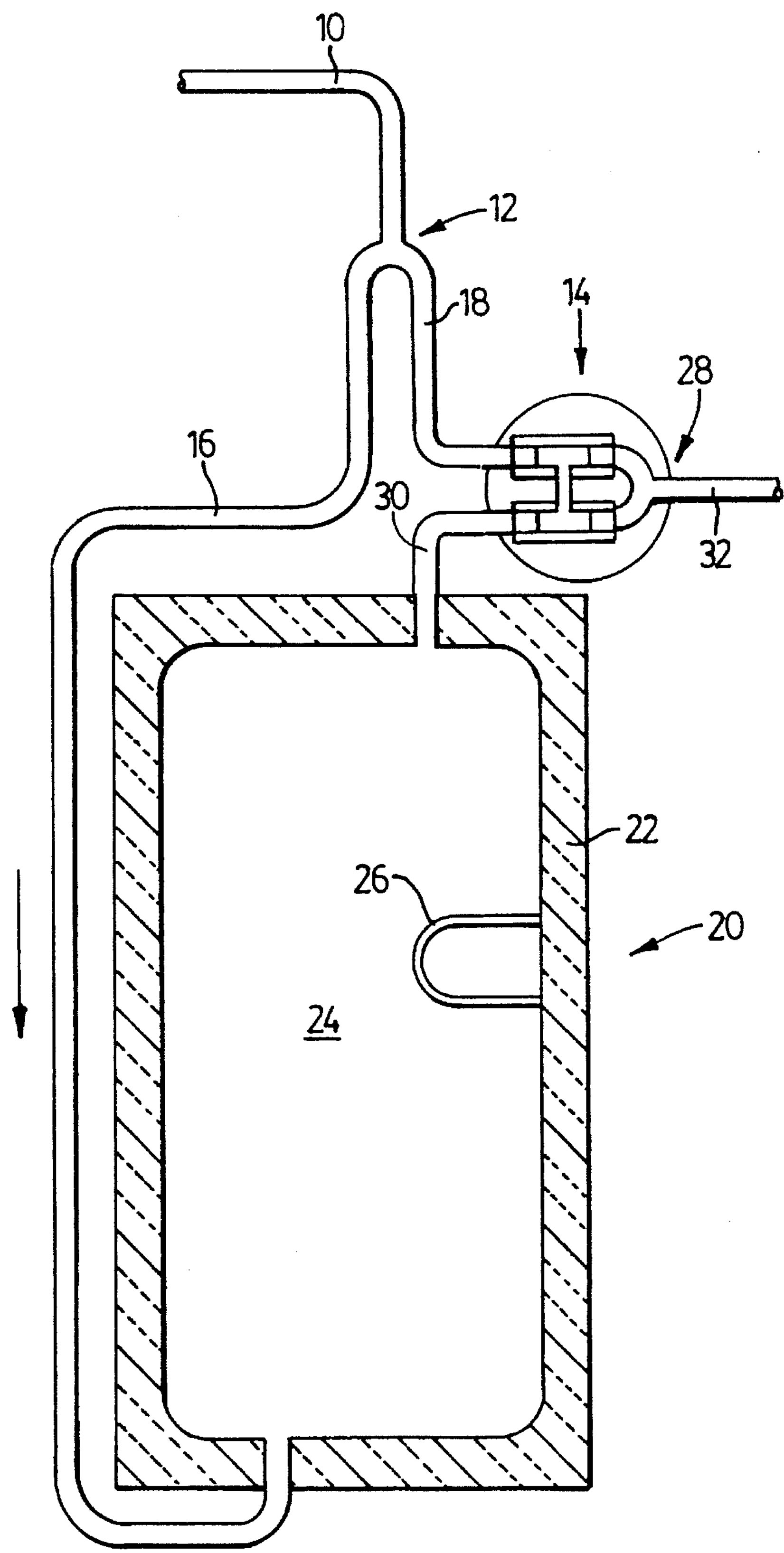
FIG. 2 is a longitudinal sectional view of a second embodiment of the tempering system of the invention, the second embodiment differing from the first embodiment in the position of the proportional flow controller.

The embodiment of FIG. 2 differs from the embodiment of FIG. 1 only in that the proportional flow controller 14 is located on the outlet side rather than the inlet side of the hot water storage tank 20. In this embodiment the lines 18 and 30 are each connected to a respective inlet of the proportional flow controller 14. The two outlets of the controller 14 are combined by the T-shaped junction member 28 into a single flow in the delivery line 32.

The proportional flow controller 14 of FIG. 1 is shown in greater detail in FIGS. 3, 4 and 5. The junction member 12 and a pair of positive-displacement metering valves 40 and 42 are sealed within a water-tight vessel 44 of the controller 14. Water in the pipe 10 branches at the junction member 12 into a conduit 46 leading to the valve 40, and into a conduit 48 leading to the valve 42. The first line 16 and the second line 18 extend from the other end of the valves 40 and 42, respectively.

The valve 40 has a pair of interlocking gears 50 and 52 mounted to rotate in counter directions within it. The valve 42 has a similar pair of interlocking gears; only one gear 54 of that pair of gears is shown. The gears 50 and 54 are linked so as to rotate in synchronism, and in the present example have a similar common axle 58 with the other gear of the valve 42. The valves 40 and 42 have a pair of housings 60 and 62, respectively. A first end of axle 56 is rotatably supported on a bearing 64 mounted on the housing 60, and the other end of axle 56 is supported on a bearing 66 on the housing 62. Each of the gears 50 and 52 has a series of circumferential teeth, and the spaces between those teeth define a series of chambers 68 with an inside surface of the housing 60. Because the gears 50 and 52 in valve 40 have a matching profile to the two corresponding gears in valve 42, any difference in the water flow rate through valves 40 and 42 is due to any difference in the widths 'a' and 'b' of the two sets of gears (and a corresponding difference in the width of a pair of channels 70 and 72 in the two valves). The constant-ratio flow rates that result from this arrangement are substantially independent of pressure differentials and temperature fluctuations in the system. One source of the proportional flow controller 14 is Brand Hydraulics of Omaha, Nebr., which offers two types: a first type that has orifices of fixed size, and a second type having externally-adjustable orifices.

A water-tight vessel 44 provides the structural support for the valves 40 and 42, and also acts to reduce the pressure differential across the bearings 64 and 66.

It is possible to use other types of interlocked positive displacement valves. For example, it is possible to use oscillating spool valves, flapping valves, or rotating valves, in fact, any type of valve where the ratio of flow rates can be prescribed.

Figure 6:
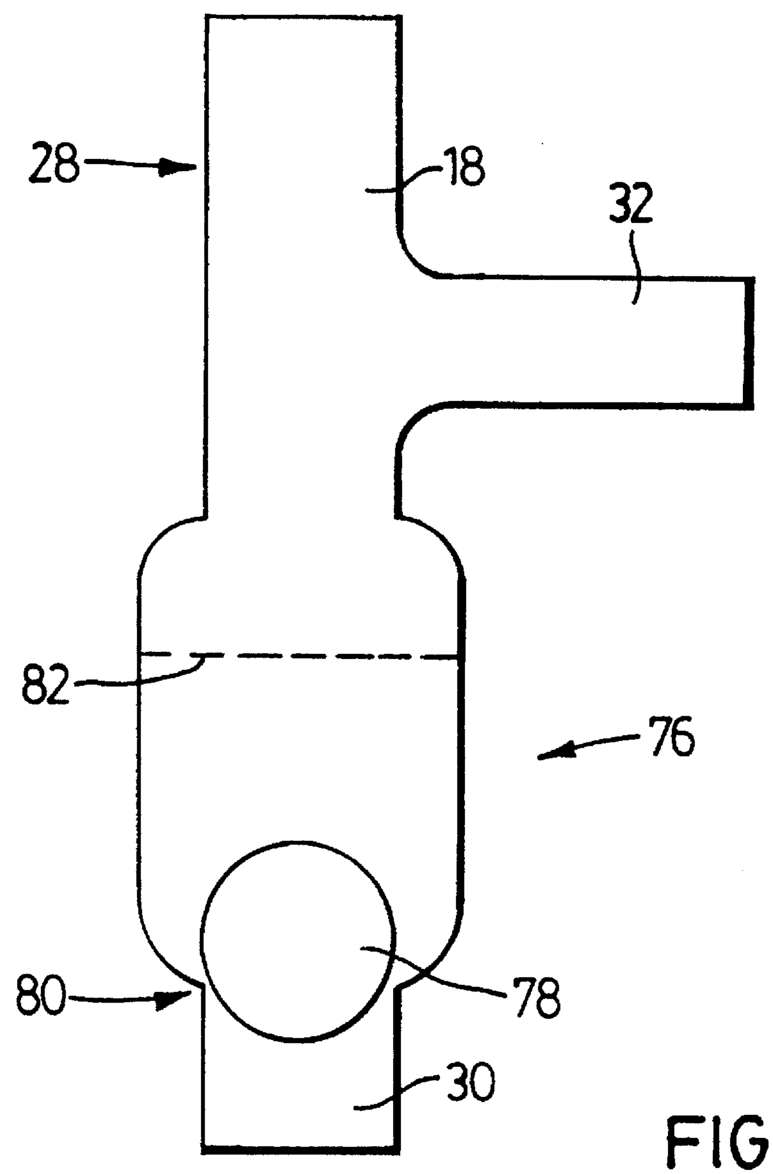

FIG. 6 illustrates a modified outlet pipe 30 which contains a stopper valve generally designated 76. The valve 76 prevents water convection and resulting heat loss through the pipe 30 when the water heating system is not on demand by the user. The stopper valve 76 has a gravity-activated sphere 78 with a density greater than that of water. When there is no user demand, there is no flow in the pipe 30 and the sphere 78 remains at rest on a support seat 80. When there is user demand, water flows through the pipe 30 and lifts the sphere 78 away from the support seat 80; the water then flows past the sphere 78 in the enlarged-diameter region of valve 76. Any movement of the sphere 78 in the enlarged-diameter region is limited by the presence of a perforated bar or plate 82 which extends across that region. A spring may be positioned between the sphere 78 and the bar or plate 82 to allow the stopper valve to be oriented other than vertically, or permit the use of a sphere which is buoyant.

I claim:

1. A hot water tempering system comprising in combination:

a hot water storage tank having an inlet line and an outlet line, the inlet line being connectable to a cold water supply line;

a bypass line connected between the inlet line and the outlet line; and a positive displacement proportional flow controller connected to the inlet line and the bypass line for locking the volumetric rates of water flow in those lines in a defined steady ratio independently of line pressure.

2. A hot water tempering system as in claim 1, wherein the proportional flow controller comprises a rotatable gear mechanism in each of the inlet line and the bypass line, each gear mechanism limiting water flow in the respective line to the water held in a series of moving chambers on the periphery of the gear mechanism, the gear mechanisms being linked together such that the water velocity in both lines is the same, the ratio of the water flow rates in the two lines being a function of the ratio of the inside area of the two lines at the location of the gear mechanisms.

3. A hot water tempering system comprising in combination:

a hot water storage tank having an inlet line and an outlet line, the inlet line being connectable to a cold water supply line;

a bypass line connectable between the inlet line and the outlet line; and a positive displacement proportional flow controller positionable on the outlet line and the bypass line for locking the volumetric rates of water flow in those lines in a defined steady ratio independently of line pressure.

4. A hot water tempering system as in claim 3, wherein the proportional flow controller comprises a rotatable gear mechanism in each of the outlet line and the bypass line, each gear mechanism limiting water flow in the respective line to the water held in a series of moving chambers on the periphery of the gear mechanism, the gear mechanisms being linked together such that the water velocity in both lines is the same, the ratio of the water flow rates in the two lines being a function of the ratio of the inside area of the two lines at the location of the gear mechanisms.

5. A hot water tempering system comprising in combination:

a hot water storage tank having an inlet line and an outlet line;

a flow dividing means for dividing a water flow in a cold water supply line between the inlet line of the tank and a second line;

a positive displacement proportional flow controller for locking the volumetric rates of water flow in the inlet line and the second line such that those flow rates are in a defined steady ratio independently of line pressure; and a flow combining means for combining a water flow in the outlet line of the tank and the water flow in the second line.

6. A hot water tempering system as in claim 5, wherein the proportional flow controller comprises:

a channel in the inlet line of the tank and a channel in the second line, the cross-sectional areas of the two channels being in a ratio corresponding to the defined ratio of flow rates; and, a flow velocity limiting means for maintaining the same flow velocity in both channels.

7. A hot water tempering system as in claim 6, wherein the flow velocity limiting means comprises:

a rotatable gear mechanism mounted in each channel; and, a linkage mechanism connecting the two gears to synchronize their rotation.

8. A hot water tempering system as in claim 7, wherein each rotatable gear mechanism comprises two linked gear wheels rotating in counter directions, each gear wheel having a series of ridges on its perimeter, and wherein water is carried in a series of chambers each defined by an adjacent pair of the ridges and an adjacent wall of the channel.

9. A hot water tempering system comprising in combination:

a hot water storage tank having an inlet line and an outlet line;

a flow dividing means for dividing a water flow in a cold water supply line between the inlet line of the tank and a second line;

a positive displacement proportional flow controller for locking the volumetric rates of water flow in the outlet line and the second line such that those flow rates are in a defined steady ratio independently of line pressure; and a flow combining means for combining the water flow in the outlet line of the tank and the water flow in the second line.

10. A hot water tempering system as in claim 9, wherein the proportional flow controller comprises:

a channel in the outlet line of the tank and a channel in the second line, the cross-sectional areas of the two channels being in a ratio corresponding to the defined ratio of flow rates; and, a flow velocity limiting means for maintaining the same flow velocity in both channels.

11. A hot water tempering system as in claim 10, wherein the flow velocity limiting means comprises:

a rotatable gear mechanism mounted in each channel; and, a linkage mechanism connecting the two gears to synchronize their rotation.

12. A hot water tempering system as in claim 11, wherein each rotatable gear mechanism comprises two linked gear wheels rotating in counter directions, each gear wheel having a series of ridges on its perimeter, and wherein water is carried in a series of chambers each defined by an adjacent pair of the ridges and an adjacent wall of the channel.

13. A hot water tempering system comprising in combination:

a hot water storage tank having a first supply line for supplying water to the tank inlet and a second supply line for supplying hot water from the tank outlet;

a third line for carrying cold water and connected to said second supply line for mixing water flowing in said second line and said cold water; and positive displacement proportional flow control means for locking the volumetric rates of flow of said cold water to that of said second supply line in a defined steady ratio independent of line pressure.

* * * * *